United States Patent

[11] 3,615,758

[72] Inventors Peter William McMillan;
 Brian Purdam Hodgson; Douglas Stanley Crozier, all of Stafford, England
[21] Appl. No. 736,291
[22] Filed June 12, 1968
[45] Patented Oct. 26, 1971
[73] Assignee The English Electric Company, Limited London, England
[32] Priority June 22, 1967
[33] Great Britain
[31] 28,788/67

[54] DEVITRIFIABLE GLASSES AND TO GLASS-CERAMICS
 10 Claims, No Drawings
[52] U.S. Cl. .................................................. 106/39 DV, 106/47 R, 106/52
[51] Int. Cl. ..................................................... C03c 3/22, C03c 3/00, C03c 3/04
[50] Field of Search ............................................ 106/47, 39 DV, 52, 54

[56] References Cited
UNITED STATES PATENTS
2,943,059 6/1960 Beck et al. ..................... 106/47 X
3,113,033 12/1963 Hoxie et al. .................... 106/54

OTHER REFERENCES
Katnack, F. L. and Hummel, F. A., Phase Equilibria in the System Zno-P2 O5, In Journal of the Electrochemical Society, 105(3) pages 125– 133, March 1958.

Primary Examiner—Tobias E. Levow
Assistant Examiner—M. Bell
Attorney—Stevens, Davis, Miller & Mosher ABSTRACT: Devitrifiable glasses and refractory glass-ceramics, especially suitable for use as insulating coatings on thin wires, contain $P_2O_5$ together with ZnO or BaO or both. MgO may be present if ZnO is present and a nucleating agent is included.

3,615,758

DEVITRIFIABLE GLASSES AND TO GLASS-CERAMICS

This invention relates to refractory glass-ceramic materials and devitrifiable glass materials from which such glass-ceramic materials may be made; and to methods of making such glass-ceramic and devitrifiable glass materials.

One object of the invention is to provide new refractory glass-ceramic materials capable of being used at temperatures up to about 700° C.

Our copending U.S. application No. 528,143 relates to methods of producing thin uniform glass coatings on fine wires, that is to say wires of not more than about 0.2 mm. diameter, the glass being typically an alkali-free barium borosilicate glass such as is described in our British Patent 882718. Such a glass is, however, found to be unsuitable for use at temperatures higher than about 500° C., due to its viscosity-temperature characteristics.

Fine insulated wires are sometimes required, especially for instrumentation purposes, for example as strain gauge or thermocouple connecting wires, in which temperatures up to about 700° C. have to be continuously withstood in service without breakdown of the insulation. Such wires need in general to be flexible.

Another object of this invention is to provide a material which is suitable for use for example as a flexible insulating coating on a fine wire at temperatures up to about 700° C.

It is desirable for many applications that the overall diameter of the coated wire shall be as small as possible, so as to enhance its flexibility and to allow large numbers of wires to be packed into narrow passageways. This is especially true where for example the wires are used in the instrumentation of a large or complicated installation in which there may be hundreds of thermocouples or strain gauges or other devices requiring electrical connection to remotely situated equipment. However, since the overall diameter must then be as small as possible, that of the wire itself must also be made as small as possible: the wire thus tends to be very weak. It is found that in the application of glasses such as the borosilicate glass, mentioned above, to such thin wires, the wires tend to fracture easily due to the fact that the glass coating has to be applied at a temperature of the order of 1000° C.

Although these difficulties can be overcome, by taking suitable precautions to keep the tensile load on the wire as low as possible, any significant increase in the temperature at which the coating is applied would increase the problems associated with the fracture of the wire: so that if a more refractory glass were used, that is to say a glass capable of withstanding temperatures very much higher than 500° C. in use (for example 700° C.) and therefore, having a much higher dilatometric softening temperature, the resulting need for a very much higher temperature for coating the wire would tend to make the coating process much more difficult, or even impossible, without using considerably thicker wire to give a correspondingly greater mechanical strength.

Another object of this invention is therefore to provide a material suitable for use for example as a flexible insulating coating on a fine wire at temperatures up to 700° C., wherein the coating operation involves applying a coating to the wire at a temperature not significantly greater than 1000° C.

It is known that for most, if not all, glass-ceramics the process of converting a devitrifiable glass to a glass-ceramic, that is to say a material in which some or all of the glass is converted by a controlled heating process into a microcrystalline form, there is a substantial increase in refractoriness, i.e. in the softening temperature and in the temperature which the material can withstand in service without appreciable change in its characteristics.

Most known glass-ceramics are based on silicate and alumino-silicate glasses, and contain an alkali-metal oxide as a flux, to allow the glass to be melted at reasonable and economic temperatures. Even so, such glasses would require to be applied to the wire at temperatures above 1100° C. if coatings of the optimum thickness, 0.0005–0.002 inch (0.0125–0.05 mm.), were to be produced on the wire.

Further objects of the invention are therefore to provide a glass-ceramic material suitable for use for example as a flexible insulating coating, in the range 0.0002–0.002 inch (0.005–0.05 mm.) thick and preferably approximately 0.0005–0.002 inch thick, on a wire, the coating being capable of withstanding temperatures up to about 700° C. in use; and to provide a devitrifiable glass capable of being coated onto the wire at a temperature not significantly greater than 1000° C. and capable of being converted to such a glass-ceramic material.

A further disadvantage of glass-ceramics containing an alkali-metal oxide is that the alkali-metal ions (e.g. Na, K, Li) are found to affect the electrical insulating characteristics adversely at high temperatures. This is certainly true at temperatures as high as 700° C.

Yet another object of the invention is therefore to provide a refractory glass-ceramic material substantially free of alkali metals and suitable for use for example as a flexible insulating coating on a fine wire, and a devitrifiable glass capable of being converted to such a glass-ceramic material.

Apart from those glass-ceramics containing substantial amounts of alkali-metal oxides, glass-ceramics are also known which contain little or no alkali-metals but considerable proportions of lead oxide (PbO) or boric oxide ($B_2O_3$) instead. Some such glass-ceramics are capable of being melted at reasonable and economic temperatures: but in some applications it is undesirable to include lead or boron in the composition.

A still further object of the invention is therefore to provide a refractory glass-ceramic material substantially free of lead and boron and suitable for use for example as a flexible insulating coating on a fine wire, and a devitrifiable glass capable of being converted to such a glass-ceramic material.

It should be emphasized that, although the materials according to this invention are suitable in the provision of insulating coatings on fine wires, they are also suitable for use as refractory insulating coatings on much larger wires; on other elongated flexible metallic members such as strip, or a plurality of wires twisted together; on other members, of whatever shape or size, and of any material, whether metallic or otherwise, to which the coating can be bonded. Furthermore, the glass-ceramic materials of the invention are not confined to use as coatings or for insulation purposes. They may be formed into articles or components for a wide variety of purposes.

According to the invention in one aspect, a refractory glass-ceramic material contains a nucleating agent together with major constituents in the following approximate proportions by weight:

| | |
|---|---|
| $P_2O_5$ | 40–60% |
| ZnO | 0–45% |
| BaO | 0–50% |
| MgO | 0–10%. |

MgO being present only if ZnO is also present, the major constituents totaling at least 85% of the total weight, and lead and alkali-metals being substantially absent.

According to the invention in another aspect, a devitrifiable glass contains a nucleating agent together with major constituents in the following proportions by weight:

| | |
|---|---|
| $P_2O_5$ | 40–60% |
| ZnO | 0–45% |
| BaO | 0–50% |
| MgO | 0–10% |

MgO being present only if Zno is also present, the major constituents totaling at least 85% of the total weight, and lead and alkali-metals being substantially absent.

Glass-ceramic and devitrifiable glass materials according to the invention preferably include as major constituents, in the following approximate proportion by weight, either:

| | |
|---|---|
| $P_2O_5$ | 45–55% |

|  |  |  |
|---|---|---|
|  | ZnO | 39–45% |
| or | P₂O₅ | 44–50% |
|  | ZnO | 8–40% |
|  | BaO | 5–37%; |
| or | P₂O₅ | 50–60% |
|  | ZnO | 20–29% |
|  | MgO | 5–9%; |
| or | P₂O₅ | 50–54% |
|  | ZnO | 21–23% |
|  | BaO | 8–15% |
|  | MgO | 1–4%; |
| or | P₂O₅ | 40% |
|  | BaO | 50% |
|  | Al₂O₃ | 5% |

The nucleating agent is preferably platinum in the approximate proportion 0.005–0.05 percent by weight, the proportion of platinum being preferably, about 0.010 percent by weight.

The nucleating agent may however be $ZrO_2$ in the approximate proportion 0.5–2 percent by weight; or gold in the approximate proportion 0.01–0.03 percent by weight; or any other suitable nucleating agents. The nucleating agent may include more then one substance, for example platinum and gold together.

In addition to the major constituents and nucleating agent, optional minor constituents in the following approximate proportions by weight, not exceeding together 15% of the total weight of the material, may be present:

| | |
|---|---|
| Al₂O₃ | 0–8% |
| SiO₂ | 0–7% |
| B₂O₃ | 0–5%. |

Preferably the weight of the said minor constituents constitutes not more than 10 percent of the total.

$B_2O_3$ can of course only be included where the material is to be employed in situations where its inclusion causes no deleterious effect.

In addition to the constituents mentioned above, the impurities usual in glass-making may be present, as may other compatible minor constituents.

According to the invention in a further aspect, a method of making an article of devitrifiable glass includes the steps of mixing batch materials; drying the resulting mixture; grinding it to a powder; melting the powder, in a vessel containing a substantial proportion of alumina ($Al_2O_3$) at a temperature in the approximate range 1000–1350°C.; forming the article from the molten mixture; and annealing the article, wherein the batch materials are substantially free from lead and alkali metals and include a nucleating agent together with materials such that the resulting glass contains major constituents in the following approximate proportions by weight:

| | |
|---|---|
| P₂O₅ | 40–60% |
| ZnO | 0–45% |
| BaO | 0–50 % |
| MgO | 0–10%, |

MgO being present only if ZnO is also present and the major constituents totaling at least 85 percent of the total weight.

Preferably, the batch materials include crystalline phosphates and a sufficient proportion of orthophosphoric acid in liquid form to yield that proportion of the $P_2O_5$ in the glass not provided by the crystalline phosphates.

According to the invention in yet another aspect, a method of making a glass-ceramic material includes the steps of making an article of devitrifiable glass by a method according to the invention heating the said glass to approximately the dilatometric softening point; holding the temperature substantially constant for at least one hour; heating the glass to a final crystallization temperature in the approximate range 700–800°C.; holding the temperature substantially constant for at least one hour to effect crystallization in the glass; and cooling the resulting glass-ceramic material.

Devitrifiable glasses according to the invention have been found to be sufficiently fluid when molten to be readily applied as a coating on a wire, sheet or other suitable article at temperatures of around 1050° C., which is not sufficiently in excess of 1000° C. to introduce serious problems (in the case of fine wires suitable for use for example as strain gauge or thermocouple wires) due to fracture of the wire. Such coatings have successfully been made to a thickness in the approximate range 0.0002–0.002 inch (0.005–0.05 mm.).

The devitrifiable glasses may be formed into solid bodies of various desired shapes by normal glassworking techniques such as casting and drawing.

Our copending British patent applications Nos. 28787/67 and 56195/67 describe methods of coating a wire, strip or other elongated flexible metallic member with a devitrifiable glass, which may be a glass according to the present invention, and forming from the glass a flexible insulating coating of glass-ceramic material on the wire, the glass-ceramic being for example one according to the present invention.

Examples of the preparation of devitrifiable glasses and of devitrified glass-ceramics, in accordance with the invention, will now be described.

Batch materials are selected to give the desired glass composition, for which the following raw materials are suitable:

| | |
|---|---|
| zinc orthophosphate | Zn₃(PO₄)₂ |
| barium hydrogen orthophosphate | BaHPO₄ |
| tri-magnesium di-orthophosphate | Mg₃(PO₄)₂ |
| orthophosphoric acid | H₃PO₄ |
| aluminum orthophosphate | AlPO₄ |
| ground Dutch silver sand | SiO₂ |
| gold chloride solution | HAuCl₄ |
| platinic chloride solution | H₂PtCl₆ |
| zirconium dioxide | ZrO₂. |

The addition of phosphorous pentoxide to the batch in the high proportions specified presents certain difficulties; it is preferred to add as much of the phosphorus pentoxide as is compatible with the remainder of the composition in the form of compounds, for example as a crystalline phosphate of zinc, barium, aluminum or magnesium. The remainder of the phosphorus pentoxide may be added either as $P_2O_5$ itself, as ammonium phosphate, or as an acid of phosphorus pentoxide such as orthophosphoric acid. Phosphorus pentoxide itself is very hygroscopic and therefore difficult to measure accurately; the use of significant amounts of ammonium phosphate results in large volumes of ammonia being liberated in the melt; and therefore it is preferred to add the remainder of the phosphorus pentoxide as orthophosphoric acid, and the following description assumes that the $P_2O_5$ is added in this form.

The solid raw materials and the orthophosphoric acid are thoroughly mixed, and the mixture is dried in an oven for 12 hours at 120° C. The mixture, which at this stage is a hard and coherent mass, is then ground until the particles pass through sieve of No. 40 mesh as defined in British Standard No. 410: 1962. The holes in such a sieve have a nominal width of about 0.38 mm.

For melting, the particles are placed in a crucible, which is preferably of recrystallized alumina (though crucibles of other refractory materials containing a high proportion of alumina could be used), and melted at temperatures in the approximate range 1,000° C. to 1,350° C., the exact value depending on the composition of the particles. Examples of suitable compositions for devitrifiable glass and glass-ceramic materials according to the invention are given in the following tables, of which:

Table A lists examples in which the major constituents are $P_2O_5$, ZnO and BaO;

Table B lists examples in which the major constituents are $P_2O_5$, ZnO and BaO;

Table C lists examples in which the major constituents are $P_2O_5$, ZnO and MgO;

Table D lists examples in which the major constituents are $P_2O_5$, ZnO BaO and MgO and;

Table E gives a single example in which the major constituents are $P_2O_5$ and BaO.

The tables also give other date relating to the properties of the devitrifiable glasses and glass-ceramics given in the various examples.

The proportions of the various constituents given in the examples are in percentages by weight.

TABLE A

| Example | 1 | 2 | 3 | 4 |
|---|---|---|---|---|
| ZnO | 40 | 45 | 39 | 44 |
| $P_2O_5$ | 50 | 55 | 46 | 46 |
| $Al_2O_3$ | 5 | | 5 | 5 |
| $SiO_2$ | 5 | | 5 | 5 |
| $B_2O_3$ | | | 5 | |
| Pt | 0.01 | 0.01 | 0.01 | 0.01 |
| Glass: | | | | |
| Thermal expansion coefficient×$10^7$ | 56.2 | 67.3 | 58.0 | 67.3 |
| Dilatometric softening temp., °C | 475 | 410 | 520 | 500 |
| Final crystn. tem., °C | 700 | 750 | 800 | 800 |
| Glass-ceramic: | | | | |
| Thermal expansion coefficient×$10^7$ | 23.0 | 5.0 | 24.6 | 21.0 |
| Dilatometric softening temp., °C | 830 | 780 | 830 | 860 |

TABLE B

| Example | 5 | 6 | 7 | 8 | 9 | 10 | 11 | 12 | 13 |
|---|---|---|---|---|---|---|---|---|---|
| ZnO | 20 | 39 | 20 | 20 | 20 | 21 | 20 | 8.9 | 22.1 |
| BaO | 20 | 5 | 22 | 25 | 22.5 | 22.5 | 20.5 | 36.3 | 17.5 |
| $P_2O_5$ | 50 | 46 | 48 | 45 | 47.5 | 46.5 | 48.2 | 44.3 | 49.0 |
| $Al_2O_3$ | 5 | 5 | 5 | 5 | 5 | 5 | 4.9 | 4.5 | 4.9 |
| $SiO_2$ | 5 | 5 | 5 | 5 | 5 | 5 | 4.9 | 4.5 | 5.0 |
| Pt | | 0.01 | 0.01 | 0.01 | 0.01 | 0.01 | | | |
| $ZrO_2$ | | | | | | | 1.5 | 1.5 | 1.5 |
| Glass: | | | | | | | | | |
| Thermal expansion coefficient×$10^7$ | 73.0 | 60.7 | 82.0 | 81.2 | 82.0 | 89.4 | 76.4 | 98.9 | 77.5 |
| Dilatometric softening temp., °C | 510 | 530 | 510 | 520 | 510 | 530 | 540 | 550 | 520 |
| Final crystn. temp., °C | 750 | 700 | 750 | 660 | 760 | 750 | 750 | 800 | 750 |
| Glass-ceramic: | | | | | | | | | |
| Thermal expansion coefficient×$10^7$ | 130 | 26.6 | 135 | 125 | 135 | 125 | 113 | 101 | 112 |
| Dilatometric softening temp., °C | 725 | 860 | 750 | 830 | 750 | 790 | 800 | 600 | 790 |

TABLE C

| Example | 14 | 15 | 16 | 17 | 18 | 19 | 20 | 21 |
|---|---|---|---|---|---|---|---|---|
| ZnO | 28.1 | 24.1 | 35 | 22.9 | 28.1 | 23.6 | 23.6 | 20.3 |
| MgO | 6.2 | 6.5 | 5 | 6.1 | 6.2 | 6.3 | 6.3 | 8.6 |
| $P_2O_5$ | 54.6 | 58.0 | 50 | 55.1 | 54.6 | 57.0 | 56.9 | 59.0 |
| $Al_2O_3$ | 5.5 | 8.0 | 5 | 5.5 | 5.6 | 7.9 | 6.8 | 6.0 |
| $SiO_2$ | 5.6 | 3.4 | 5 | 5.6 | 5.5 | 3.4 | 4.6 | 6.1 |
| Pt | | 0.01 | 0.01 | | 0.01 | | | 0.01 |
| $ZrO_2$ | | | | 1.8 | | 1.8 | 1.8 | |
| Au | 0.03 | | | | | | | |
| Glass: | | | | | | | | |
| Thermal expansion coefficient×$10^7$ | 56.2 | 54.6 | 59.1 | 54.9 | 48.3 | 50.0 | 56.7 | 53.0 |
| Dilatometric softening temp., °C | 550 | 520 | 490 | 540 | 525 | 530 | 510 | 560 |
| Final crystn. temp., °C | 775 | 800 | 700 | 700 | 750 | 750 | 750 | 750 |
| Glass-ceramic: | | | | | | | | |
| Thermal expansion coefficient×$10^7$ | 58.8 | 72.1 | 18.5 | 60.4 | 59.5 | 57.5 | 57.0 | 59.9 |
| Dilatometric softening temp., °C | 750 | 850 | 810 | 660 | 750 | 770 | 770 | 640 |

TABLE D

| Example | 22 | 23 | 24 |
|---|---|---|---|
| ZnO | 21.0 | 21.7 | 22.1 |
| BaO | 14.6 | 10.6 | 8.1 |
| MgO | 1.8 | 2.8 | 3.8 |
| $P_2O_5$ | 50.6 | 52.4 | 53.3 |
| $Al_2O_3$ | 5.1 | 5.3 | 5.4 |
| $SiO_2$ | 5.2 | 5.4 | 5.5 |
| $ZrO_2$ | 1.7 | 1.8 | 1.8 |
| Glass: | | | |
| Thermal expansion coefficient×$10^7$ | 71.2 | 64.6 | 65.9 |
| Dilatometric softening temp., °C | 510 | 560 | 550 |
| Final crystn. temp., °C | 750 | 800 | 750 |
| Glass-ceramic: | | | |
| Thermal expansion coefficient×$10^7$ | 86.1 | 87.7 | 75.9 |
| Dilatometric softening temp., °C | 820 | 600 | 680 |

TABLE E

| Example | 25 |
|---|---|
| BaO | 50 |
| $P_2O_5$ | 40 |
| $Al_2O_3$ | 5 |
| $SiO_2$ | 5 |
| Pt | 0.01 |
| GLASS | |
| thermal expansion coefficient × $10^7$ | 142 |
| dilatometric softening temp. °C | 500 |
| final crystn. temp. °C | 750 |
| GLASS-CERAMIC | |
| thermal expansion coefficient × $10^7$ | 133 |
| dilatometric softening temp. °C | 840 |

The melting temperatures are chosen to give homogeneous glass free from gas bubbles and with a minimum of crucible attack. For example, a glass as in example 2 may be melted at 1,100° C., while that in example 5 should be melted at 1,250° C.

The glass is then shaped by normal glass-working processes; molten glass from the crucible may be cast, for example into disc or bar form, or may be drawn to produce rod. The glasses may then be annealed, the annealing temperature depending on the glass composition, that given in example 1 being annealed at 450° C. and that in example 5 at 525° C. After annealing, the devitrifiable glass may be stored until required.

The shaped articles of devitrifiable glass are subsequently heat-treated in order to convert them to articles of microcrystalline devitrified glass-ceramic material according to the invention, as follows:

The glass articles are heated at a rate not exceeding 10° C. per minute, and preferably at 3–5° C. per minute, to a nucleation temperature, which should approximate to the dilatometric softening temperature ("Mg. point") of the particular glass composition. This temperature is maintained for at least one hour, and this treatment serves to form nuclei in the glass and to initiate crystallization.

The articles are then further heated, at 2–3° C. per minute, to a final crystallization temperature, which is also maintained for at least one hour. This temperature varies from about 700° C. to about 800° C. depending on the composition of the material. During this stage of the process, crystallization proceeds rapidly and a dense material, containing closely interlocking crystals, is obtained.

The glass-ceramics articles are then cooled to room temperature; the rate of cooling should be such that the glass-ceramic does not fracture as a result of temporary stresses set up by thermal gradients in the article: for example it may be at the rate of 5° C. per minute.

The glass-ceramics thus produced have been found to be microcrystalline, and the articles have been found not to undergo any noticeable deformation during the heat-treatment process.

The types of major crystal phases which have been identified by X-ray diffraction analysis were as follows:

| Examples 1–4: | zinc phosphate |
|---|---|
| Examples 5–13: | zinc phosphate and barium phosphate |
| Examples 14–21: | zinc phosphate and magnesium phosphate |
| Examples 22–24: | zinc phosphate and barium phosphate. |
| Example 25: | barium phosphate. |

In addition to the crystal phases, each glass-ceramic also contained an uncrystallized phase.

The glass-ceramics using platinum as a nucleating agent are light grey in color, those using zirconium dioxide are white, and those using gold are pale pink.

The linear thermal expansion coefficients of the glass-ceramics range from $5 \times 10^{17}$ (example 2) to $135 \times 10^{17}$ (examples 7 and 9). The lowest values are obtained with materials of which the major constituents are only ZnO and $P_2O_5$, and in these materials the thermal expansion coefficient decreases sharply from about 75° C. upwards, reaching its highest negative value at about 150° C. Above this temperature the coefficient increases again, and eventually becomes positive, having zero value at about 400° C.

The expansion coefficient over the range 20–400° C. is therefore zero. The values given in the tables are quoted over the range 20–500° C. for the glass-ceramics and over the range 20–400° C. for the devitrifiable glasses.

The glass-ceramics also have particularly high volume resistivities at high temperatures; for instance a glass-ceramic of Composition No. 14 has volume resistivities of $10^{7.9}$ and $10^6$ ohm-cm. at 500° C. and 700° C. respectively. A glass-ceramic of Composition No. 4 has volume resistivities of $10^{8.1}$ and $10^{5.9}$ ohm-cm. at 500° C. and 700° C. respectively.

The glass-ceramic materials are much more refractory than the respective devitrifiable glasses from which they were made, as will be evident from a comparison of the dilatometric softening temperature of the glass with that of the glass-ceramic. The glass-ceramic materials are found to function satisfactorily as insulating materials at temperatures at least up to about 700° C.

We claim:

1. A refractory glass-ceramic material consisting essentially of the following major constituent in percentages by weight:

| | |
|---|---|
| $P_2O_5$ | 40–60% |
| ZnO | 0–45% |
| BaO | 0–50% |
| MgO | 0–10% | the amount of MgO being not more than about 31 percent of the amount of MgO and ZnO together and the major constituents totaling at least 85 percent, together with a small but effective amount of a nucleating agent.

2. A refractory glass-ceramic material according to claim 1, wherein the major constituents are, in percentages by weight:

| | |
|---|---|
| $P_2O_5$ | 45–55% |
| ZnO | 39–45% |

3. A refractory glass-ceramic material according to claim 1, wherein the major constituents are, in percentages by weight:

| | |
|---|---|
| $P_2O_5$ | 44–50% |
| ZnO | 8–40% |
| BaO | 5–37% |

4. A refractory glass-ceramic material according to claim 1, wherein the major constituents are, in percentages by weight:

| | |
|---|---|
| $P_2O_5$ | 50–60% |
| ZnO | 20–29% |
| MgO | 5–9% |

5. A refractory glass-ceramic material according to claim 1, wherein the major constituents are, in percentages by weight:

| | |
|---|---|
| $P_2O_5$ | 50–54% |
| ZnO | 21–23% |
| BaO | 8–15% |
| MgO | 1–4% |

6. A refractory glass-ceramic material according to claim 1, wherein the major constituents are, in percentages by weight:

| | |
|---|---|
| $P_2O_5$ | 40% |
| BaO | 50% | and the composition also includes 5 percent by weight of $Al_2O_3$.

7. A refractory glass-ceramic material according to claim 1, wherein the nucleating agent is Pt in the proportion of 0.005–0.05 percent by weight.

8. A refractory glass-ceramic material according to claim 1, wherein the nucleating agent is $ZrO_2$ in the proportion of 0.5–2 percent by weight.

9. A refractory glass-ceramic material according to claim 1, wherein the nucleating agent is Au in the proportion of 0.01–0.03 percent by weight.

10. A refractory glass-ceramic material according to claim 1, including also the following minor constituents, in percentages by weight:

| | |
|---|---|
| $Al_2O$ | 0–8% |
| $SiO_2$ | 0–7% |
| $B_2O_3$ | 0–5% | the total of the minor constituents other than the nucleating agent not exceeding 15 percent by weight.

UNITED STATES PATENT OFFICE
CERTIFICATE OF CORRECTION

Patent No. 3,615,758           Dated October 26, 1971

Inventor(s) PETER WILLIAM McMILLAN et al

It is certified that error appears in the above-identified patent and that said Letters Patent are hereby corrected as shown below:

Column 5, Table E: the word "GLASS" at line 66 should be below the separating line which it is now immediately above;

Column 5, Table E: the word "GLASS-CERAMIC" at line 72 should be below the separating line which it is now immediately above.

Column 7, line 7, for "$5 \times 10^{17}$" read -- $5 \times 10^{-7}$ --

Column 7, line 7, for "$135 \times 10^{17}$" read -- $135 \times 10^{-7}$ --

Signed and sealed this 12th day of December 1972.

(SEAL)
Attest:

EDWARD M. FLETCHER, JR.
Attesting Officer

ROBERT GOTTSCHALK
Commissioner of Patents